July 29, 1947.  R. C. TRESEDER  2,424,864

VIBRATION RESPONSIVE APPARATUS

Filed May 2, 1944

Inventor:
Robert C. Treseder,
By Joseph M. Hazell
Clade Koontz
Attorneys

Patented July 29, 1947

2,424,864

UNITED STATES PATENT OFFICE 2,424,864

VIBRATION RESPONSIVE APPARATUS

Robert C. Treseder, Dayton, Ohio

Application May 2, 1944, Serial No. 533,785

6 Claims. (Cl. 73—70)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to vibration responsive apparatus and more particularly to apparatus for measuring and indicating the frequency and amplitude of vibrations.

It has heretofore been proposed to measure vibrations my employing a flexible reed which can be tuned to resonance with the vibrations to indicate the amplitude and frequency thereof. In order to obtain an accurate indication it is desirable to employ a reed having a sharp peaking resonance curve but it is difficult to tune such reeds accurately and any slight variation in the frequency of the vibrations being measured throws the reed out of resonance so that it is difficult to measure the amplitude of the variations. The ideal resonance curve for such an apparatus would be one which is substantially rectangular with vertical sides and a relatively broad flat top and it is one object of the present invention to provide vibration responsive apparatus having a resonance curve with substantially these characteristics.

Another object of the invention is to provide vibration responsive apparatus including a plurality of reeds whose resonant frequencies differ slightly and which are simultaneously adjustable to vary their resonant frequencies.

Still another object of the invention is to provide vibration responsive apparatus in which the average amplitude and frequency of a plurality of reeds whose resonant frequences differ slightly is indicated electrically.

The above and other objects and advantages of the invention will be more readily apparent from the following description when read in connection with the accompanying drawing, in which—

Figure 1:
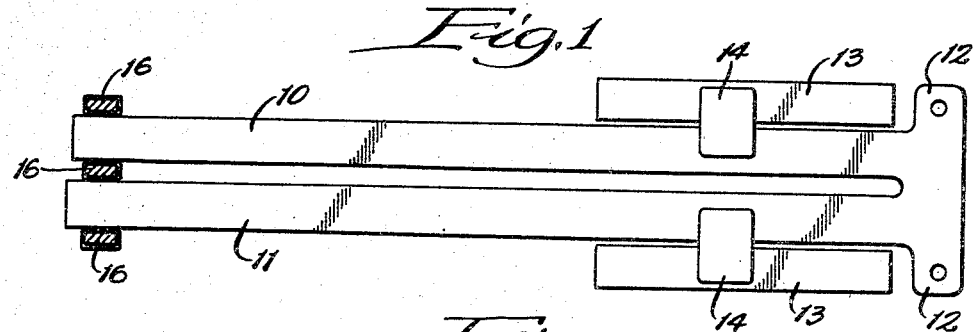
Figure 1 is a diagrammatic plan view with parts in section of one form of apparatus embodying the invention.
Figure 2:
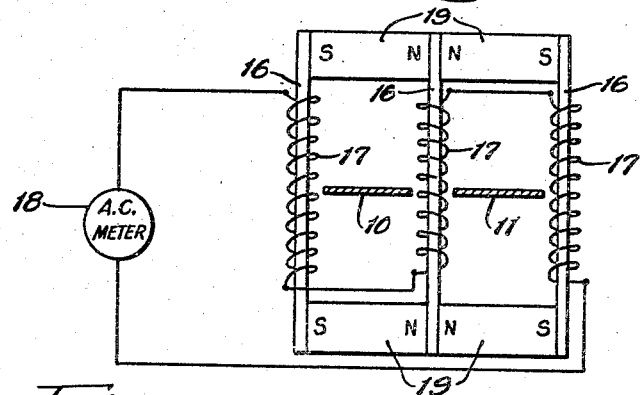
Figure 2 is a diagrammatic end elevation of the apparatus of Figure 1.

As shown in the drawing the apparatus comprises a pair of flexible reeds 10 and 11 which are preferably formed by slitting a single sheet of flexible material from one end substantially to the opposite end. The reeds are mounted by ears or flanges 12 formed on the sheet and which may be attached to a frame. Guide plates 13 of the same thickness as the reeds are mounted beside them and the reeds and guide plates are engaged on their opposite surfaces by rollers 14 which are adjustable longitudinally of the reeds to vary the effective length thereof. The apparatus for mounting the reeds and adjusting their effective length may be substantially like that more particularly described and claimed in the copending application of Kent and Treseder, Serial No. 538,830, filed May 9, 1944.

The reeds 10 and 11 are formed to have a slightly different resonant frequency and this may be accomplished by variably weighting the reeds, by forming them of different width or by making them of a slightly different length. As shown in the drawing, the reed 10 is slightly shorter than the reed 11 so that its resonant frequency will differ slightly from that of the reed 11 at all times. It will be noted that adjustment of the rollers 14 varies the length of the reeds the same amount so that their resonant frequencies will always be varied proportionally.

Figure 3:
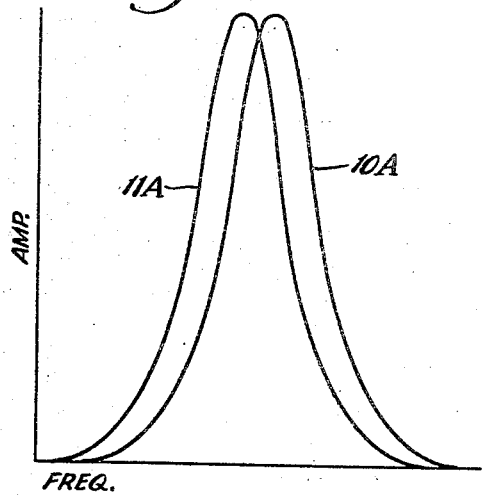
Figure 3 is a diagram illustrating the individual resonant frequency curves of the reeds.

The resonant frequency curves of the two reeds are indicated in Figure 3, the curve for the reed 10 being shown at 10A and for the reed 11 by the curve 11A. It will be noted that both of these curves peak rather sharply and have relatively steep sides. With a curve of this character, the resonant frequency can be determined very accurately by noting the point at which the vibration of the reed reaches its maximum amplitude. However, since the peaks are extremely sharp, a fine adjustment is required and if there is any slight variation in the frequency of the vibrations being measured, the reed will be thrown out of resonance. It is therefore difficult with a reed of this type to obtain an accurate indication of amplitude.

Figure 4:
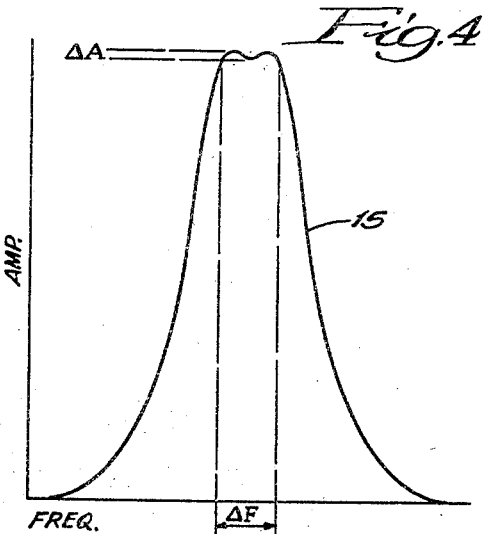
Figure 4 is a similar diagram showing the combined resonant frequency curve for the apparatus.

The present apparatus in which a plurality of reeds are employed serves to combine the individual curves of the reeds to provide an overall operating curve as shown at 15 in Figure 4. It will be noted that this curve has a relatively flat broad top and steep sides corresponding to the sides of the curves 10A and 11A respectively. With a curve of this character, the frequency can vary throughout the range indicated by $\Delta F$ and the amplitude variation through the entire range will be equal to $\Delta A$. Therefore, by adjusting the apparatus to a frequency within the range $\Delta F$, a measurement of the amplitude within a range of accuracy equal to $\Delta A$ can be obtained. This indication can be noted visually or in any other desired manner.

According to the present invention, indication of the amplitude and frequency is preferably obtained electrically by providing a plurality of magnetic cores 16 arranged between the reeds adjacent their free ends and beside the outer sides of the reeds. Coils 17 are wound on the cores and are connected in series as shown with the outermost coils connected to a voltage responsive device such as a milliammeter 18. The reeds 10 and 11 may be formed of magnetic material or may carry magnetic armatures registering with the coils so that different numbers of turns of the coils will be linked depending upon the position of the reeds. A magnetic field is impressed across the coils and reeds by means of bar magnets 19 connected to the cores 16 with their like poles adjacent the same core as shown.

In operation as the reeds vibrate variably to link the coils, a current will be generated which is proportional to the amplitude and frequency of the vibrations. The value of this current is indicated by the meter 18 which can be graduated to read directly in terms of the product of amplitude and frequency. If the frequency is known, as for example from the known adjustment of the reed, the amplitude can easily be determined. As an alternative the current can be integrated to give a direct indication of amplitude. Since the coils are in series the current values created by the two reeds will be averaged to provide an operating curve for the apparatus like the curve 15 of Figure 4.

In using the apparatus to measure mechanical vibrations, the reed may be placed in contact with the vibrating body and the rollers 14 adjusted until a maximum reading on the meter 18 is obtained. At this time, the frequency of the vibrations is indicated by the position of the rollers and the amplitude may be determined from the meter reading.

While one embodiment of the invention has been shown and described in detail herein, it is understood that this is illustrative only and is not intended as a definition of the scope of the invention, reference being had for this purpose to the appended claims.

What is claimed is:

1. Vibration responsive apparatus comprising a plurality of vibratory reeds mounted side by side and having different resonant frequencies, and adjustable support means extending across and engaging the reeds and adjustable lengthwise thereof simultaneously to vary the resonant frequency of the reeds.

2. Vibration responsive apparatus comprising a plurality of vibratory reeds mounted side by side and having different resonant frequencies, coils mounted between the reeds and adjacent the outer sides of the outer reeds, magnetic means for impressing a magnetic field on the coils and reeds, the coils being connected in series, and an indicating meter connected between the end coils.

3. Vibration responsive apparatus comprising a plurality of vibratory reeds mounted side by side and having different resonant frequencies, magnetic cores mounted between the reeds and beside the outer sides of the outer reeds, magnets to magnetize the cores, coils wound on the cores and connected in series, and an indicating meter connected to the outer coils.

4. Vibration responsive apparatus comprising a plurality of vibratory reeds mounted side by side and having different resonant frequencies, means for simultaneously varying the resonant frequencies of the reeds, coils mounted between the reeds and beside the outer reeds and connected in series, means for impressing a magnetic field across the coils and reeds, and an indicating meter connected across the end coils.

5. Vibration responsive apparatus comprising a plurality of vibratory reeds mounted side by side and having different resonant frequencies, an adjustable support extending across the reeds and movable lengthwise thereof to vary their effective length, magnetic cores mounted between and beside the reeds adjacent their free ends, magnets to magnetize the coils, coils wound on the cores and connected in series, and an indicating meter connected across the end coils.

6. Vibration responsive apparatus comprising a flat sheet of flexible material fixedly mounted adjacent one end and split from its other end to provide a plurality of vibratory reeds, said reeds being so formed as to have different resonant frequencies, and an adjustable support engaging the reeds and movable lengthwise thereof simultaneously to vary the effective lengths of the reeds.

ROBERT C. TRESEDER.

REFERENCES CITED

The following references are of record in the file of this patent:

UNITED STATES PATENTS

| Number | Name | Date |
|---|---|---|
| 1,262,359 | Kropp | Apr. 9, 1918 |
| 2,293,166 | Olson | Aug. 18, 1942 |
| 2,359,158 | Rushing et al. | Sept. 26, 1944 |
| 996,713 | Hartmann-Kempf | July 4, 1911 |
| 1,397,525 | Kennedy | Nov. 22, 1921 |
| 2,163,195 | Edwards | June 20, 1939 |

FOREIGN PATENTS

| Number | Country | Date |
|---|---|---|
| 93,690 | Austria | Mar. 15, 1923 |